J. C. DASSLER.
CAMERA SHUTTER.
APPLICATION FILED APR. 14, 1909.

983,027.

Patented Jan. 31, 1911.

Witnesses.
C. F. W. Dassler
A. Anderson

Inventor.
John Carl Dassler

UNITED STATES PATENT OFFICE.

JOHN CARL DASSLER, OF LEAVENWORTH, KANSAS.

CAMERA-SHUTTER.

983,027.

Specification of Letters Patent. Patented Jan. 31, 1911.

Application filed April 14, 1909. Serial No. 489,961.

*To all whom it may concern:*

Be it known that I, JOHN CARL DASSLER, a citizen of the United States, residing at the city of Leavenworth, county of Leavenworth, and State of Kansas, have invented a new and useful Locking Device for Certain Types of Camera-Shutters, as described in the following specification.

Figure 1:
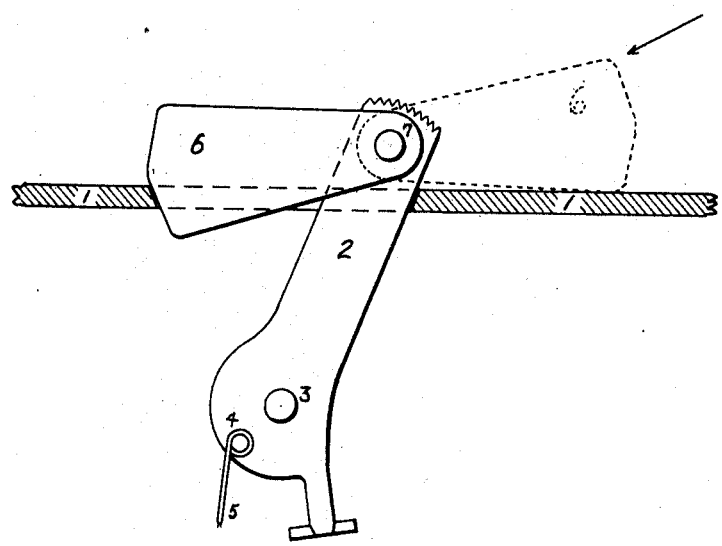
Figure 2:
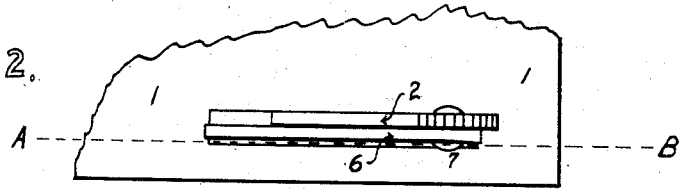
Figure 3:
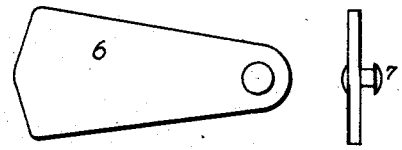

In the accompanying drawing, Figure 1 is a vertical section along the line A B of Fig. 2. Fig. 2 is a plan view of the device attached to the shutter. Fig. 3 is a side and end view of the locking device itself.

1 is the side or top or end of the camera box.

2 is a lever similar to those by which certain types of camera shutters are operated.

3 is the pivot on which the lever 2 moves.

4 is the point where spring 5 is fastened to lever 2.

5 is a spring that aids in the operation of these types of shutters.

6 is the blade which constitutes my locking device.

7 is one means of attaching blade 6 to the camera shutter.

Blade 6, preferably metal, is pivoted to lever 2, at some point 7. This blade is of such shape and size and so pivoted to the lever 2, that when the lever 2, is at one end of the slot the blade 6, will partly drop into the slot (as shown in Fig. 1) and also of such shape and size and so pivoted to the lever 2, that when the blade is in the above described position, it will project above the camera box enough and in such a way as to make the blade convenient to get hold of, and further of such size and shape and so pivoted to lever 2, that the blade can be swung into the position indicated by the dotted lines 6, and by pushing on the blade in the direction indicated by the arrow the lever 2, will move to the other end of the slot, and the blade will drop into the near side of the slot, thus operating the shutter and locking it in place and thus preventing any accidental operation of the shutter, or shifting of the lever to a position (as midposition) where it would not be readily seen which way to move the lever for the proper operation of the shutter and also preventing operation or shifting of the lever to mid-position from the action of spring 5.

Having thus described my invention, what I claim and desire to secure by Letters Patent is—

The combination, with the operating lever of any type of camera shutter that is actuated by a lever projecting through a slot in the end or side of the camera box, of a camera wall having a slot therein and a blade pivoted to the projecting end of said lever, and so shaped that when said operating lever is at one end of the slot the blade will drop into the other end of the slot and lock the lever in place, substantially as above described.

In testimony whereof I affix my signature in the presence of two witnesses.

JOHN CARL DASSLER.

Witnesses:
C. F. W. DASSLER,
VIVIAN L. CONNOR.